United States Patent [19]

Nickels, Jr.

[11] Patent Number: 4,684,792
[45] Date of Patent: Aug. 4, 1987

[54] MULTIPLE INPUT COMPACT TICKET PROCESSOR

[75] Inventor: Richard C. Nickels, Jr., Hampstead, Md.

[73] Assignee: General Instrument Corp., New York, N.Y.

[21] Appl. No.: 803,308

[22] Filed: Dec. 2, 1985

[51] Int. Cl.$^4$ ............................................. G06K 7/00
[52] U.S. Cl. ..................................... 235/384; 235/482
[58] Field of Search ............................... 235/384, 482

[56] References Cited

U.S. PATENT DOCUMENTS

4,357,530 11/1982 Roes .................................... 235/384

Primary Examiner—Harold I. Pitts
Attorney, Agent, or Firm—James & Franklin

[57] ABSTRACT

Tickets with customer markable areas are insertable into an input slot facing the agent side of the processor, an input slot facing the customer side of the processor, or by either the agent or the customer into an input slot located on the top of the processor. The slots feed different points along an arcuate channel. The end of the channel is located at the beginning of a straight line transport path passing through a ticket reader and a ticket printer to an output slot facing the agent side of the processor. A single drive motor, actuated by a ticket sensor at the end of the channel, provides power to all of the drive rollers. A lock-out mechanism located in the channel prevents tickets from being inserted from the agent side or the top surface if a ticket has been received from the customer side, and prevents tickets from being inserted from the customer side if a ticket has been received from the agent side.

25 Claims, 10 Drawing Figures

MULTIPLE INPUT COMPACT TICKET PROCESSOR

The present invention relates to ticket processors and, more particularly, to a compact ticket processor having multiple input slots permitting customer marked tickets to be received from the customer side, the agent side, and the top surface of the processor, respectively.

Modern wagering systems, such as on-track and off-track parimutuel betting systems and lotteries often utilize tickets of various types upon which the various transactional data is recorded so as to function as receipts for the customer. Normally, the customer advises the agent as to the wagering information, the agent collects the appropriate amount of money from the customer and manipulates a ticket printing mechanism which prints a ticket with the appropriate transactional data and, at the same time, records the transaction in a computer memory.

Ticket processing mechanisms have also been employed which accept customer markable tickets. At the point of sale, an agent receives the marked ticket and the appropriate amount of money from the customer. The agent then inserts the ticket into the mechanism and makes the appropriate entries on an input keyboard such that the ticket is read and a receipt is printed with the transactional information. As the transaction information is recorded, the printed receipt is provided to the agent, who hands it to the customer.

It is, however, advantageous to have a ticket processing mechanism which can accept customer-marked tickets, either directly from the customer or from the agent so as to increase the speed of the transaction and permit a single agent to operate several ticket processors at the same time. In general, this is achieved in the present invention by a ticket processor which permits tickets to be received from several directions, that is, from the customer side of the processor, from the agent side of the processor, or from the top surface of the processor which is accessible by either the agent or the customer. The size and complexity of the ticket processor are significantly reduced through the use of a straight line ticket transport path which operates with only a single drive motor.

It is, therefore, a prime object of the present invention to provide a ticket processor having multiple input slots which receive tickets from different directions.

It is another object of the present invention to provide a multiple input ticket processor of highly compact design.

It is another object of the present invention to provide a multiple input compact ticket processor wherein tickets can be received from either the customer side of the processor, the agent side of the processor, or from the top surface of the processor, accessible by either the agent or the customer.

It is another object of the present invention to provide a multiple input compact ticket processor wherein a single motor is utilized to power all of the drive rollers along the ticket transport path.

It is another object of the present invention to provide a multiple input compact ticket processor with a straight line ticket transport path.

It is another object of the present invention to provide a multiple input compact ticket processor including a lock-out mechanism which prevents tickets from being inserted from the agent side of the processor or from the top surface of the processor while a ticket is being received from the customer side of the processor and to prevent tickets from being inserted from the customer side while a ticket is being received from the agent side.

In accordance with one aspect of the present invention, a ticket processor adapted to receive customer-marked tickets is provided. The processor comprises a housing having an input portion and a base portion. The input portion has first, second and third surfaces. Ticket input means are situated within the input portion. Ticket reader means and ticket printer means are provided. Ticket output means are situated in the base portion. The ticket input means comprises first, second, and third input slots located on the first, second, and third surfaces of the input portion. The first and second surfaces face in substantially opposite directions. The third input surface faces a direction substantially perpendicular to the first and second surfaces.

The output means comprises an output slot. The output slot is situated on a surface of the base portion. This surface is substantially parallel to the first surface of the input portion.

The input means further comprises an arcuate ticket channel. The first, second, and third input slots feed the arcuate channel.

Means are provided which are associated with one of the first, second, or third input slots for sensing the presence of the ticket therein. Means, actuated in response to the sensing of the presence of the ticket in the one input slot, are provided for preventing tickets from being received from the other input slots.

A substantially straight line ticket transport path is provided. The ticket transport path extends from the input means, through the reader means, through the printer means, to the output means.

Drive rollers are provided along the ticket transport path for moving the ticket. A motor is provided along with means for operably mechanically connecting each of the drive rollers with the motor.

Means are provided in association with the input means for sensing the presence of a ticket. Means are provided for actuating the motor when the presence of a ticket is sensed.

In accordance with another aspect of the present invention, a ticket processor is provided for use with a ticket having customer markable areas, insertable by either a customer or an agent. The processor comprises a housing with an input portion and a base portion. The input portion has an agent side and a customer side. Input means are provided comprising a first input slot for accepting a ticket from the agent side, a second input slot for accepting a ticket from the customer side, and a third input slot for accepting a ticket from either the agent or the customer. Ticket reader means, ticket printer means are also provided, as is output means on the base portion. The ticket output means ejects tickets on a side of the base portion substantially parallel to the agent side.

The processor has a top surface. The third input slot is located on the top surface so as to be accessible by either the agent or the customer.

The input means comprises an arcuate channel. The first, second, and third input slots feed the arcuate ticket channel.

Means are provided in association with one of the first, second, and third input slots for sensing the presence of a ticket therein. Means are provided which are actuated in response to the sensing of the presence of the ticket in the one input slot for preventing the ticket from being received from the other input slots.

A substantially straight line ticket transport path is provided from the input means, through the reader means, through the printer means, to the output means. Drive rollers are provided along the ticket transport path. A single drive motor is provided in conjunction with means for operably mechanically connecting each of the drive rollers with the motor so as to drive the rollers.

Means are provided in association with the input means for sensing the presence of a ticket. Means are provided for actuating the motor when the presence of a ticket is sensed.

In accordance with another aspect of the present invention, the processor includes a housing with an input portion and a process portion. The input portion has a first surface on the agent side and a second surface on the customer side. Ticket input means are located within the input portion. Ticket reader means, ticket printer means, and ticket output means are located in the process portion. The ticket input means includes first and second input slots located on the first and second surfaces, respectively. Means are provided, in association with one of said slots for preventing a ticket from being received into the reader means from the other slot when a ticket is present in the first slot.

Preferably, the processor also comprises second means, associated with the first slot for preventing a ticket from being received into said reader means from the first slot when a ticket is present in the other slot.

Each of the ticket preventing means is operably connected to a ticket sensing means proximate the other slot. When a ticket is sensed in one slot, the ticket preventing means associated with the other slot is actuated. Preferably, each ticket preventing means comprises an electrically actuated solenoid with an extendible rod which, when extended, intersects the slot to block passage of a ticket therethrough.

To these and to such other objects which may hereinafter appear, the present invention relates to a multiple input compact ticket processor, as described in the following specification and recited in the annexed claims, taken together with the accompanying drawings, wherein like numerals refer to like parts, and in which:

Figure 1:
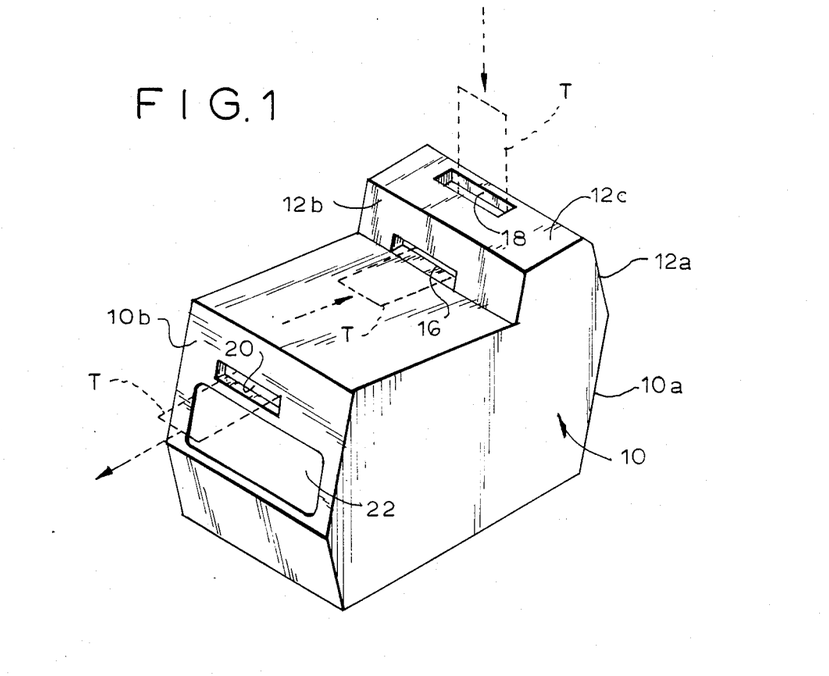
FIG. 1 is an isometric view of the ticket processor of the present invention, as viewed from the agent side thereof.
Figure 2:
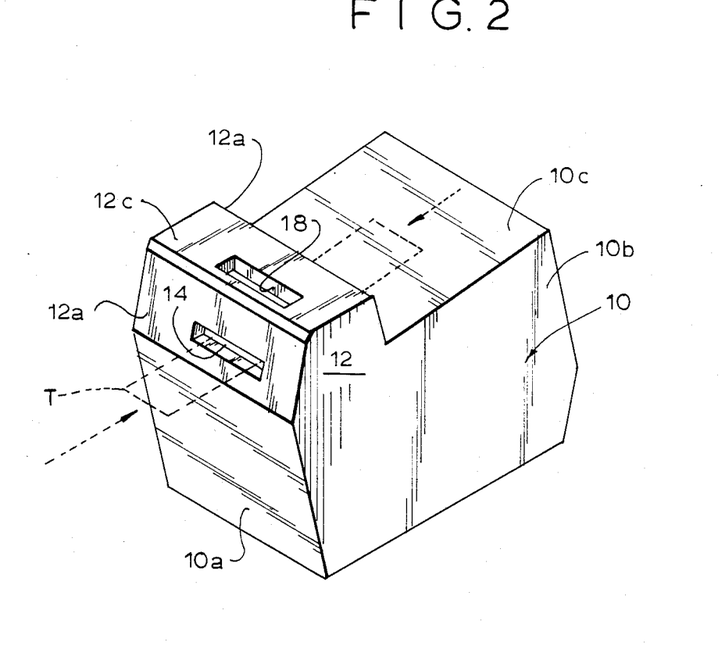
FIG. 2 is an isometric view of the ticket processor of the present invention as viewed from the customer side thereof.

As illustrated in FIGS. 1 and 2, the ticket processor of the present invention comprises a generally rectangular base portion 10 with an upstanding ticket input portion 12, located on the top surface of base portion 10. Base portion 10 has a side 10a situated to face the customer and a side 10b situated to face the agent. Base 10 also has a top surface 10c. Similarly, input portion 12 has a side 12a situated to face the customer, a side 12b situated to face the agent, and a top surface 12c.

Input section 12 is provided with three ticket input slots 14, 16 and 18 on sides 12a, 12b and top surface 12c, respectively. As illustrated in FIG. 2, slot 14 is situated to receive a ticket T inserted by the customer from the customer side of the processor. Slot 16 is situated to receive a ticket T inserted by the agent from the agent side of the processor. Slot 18, because it is situated on the top surface of the input section, can receive a ticket T from either the agent or the customer.

Side 10b of base 10 is provided with an output slot 20 for ejecting a printed ticket T to the agent. In addition, immediately below slot 20, on surface 10b, is an input keyboard 22 of conventional design which can be manipualted by the agent to operate the processor.

Figures 8, 9:
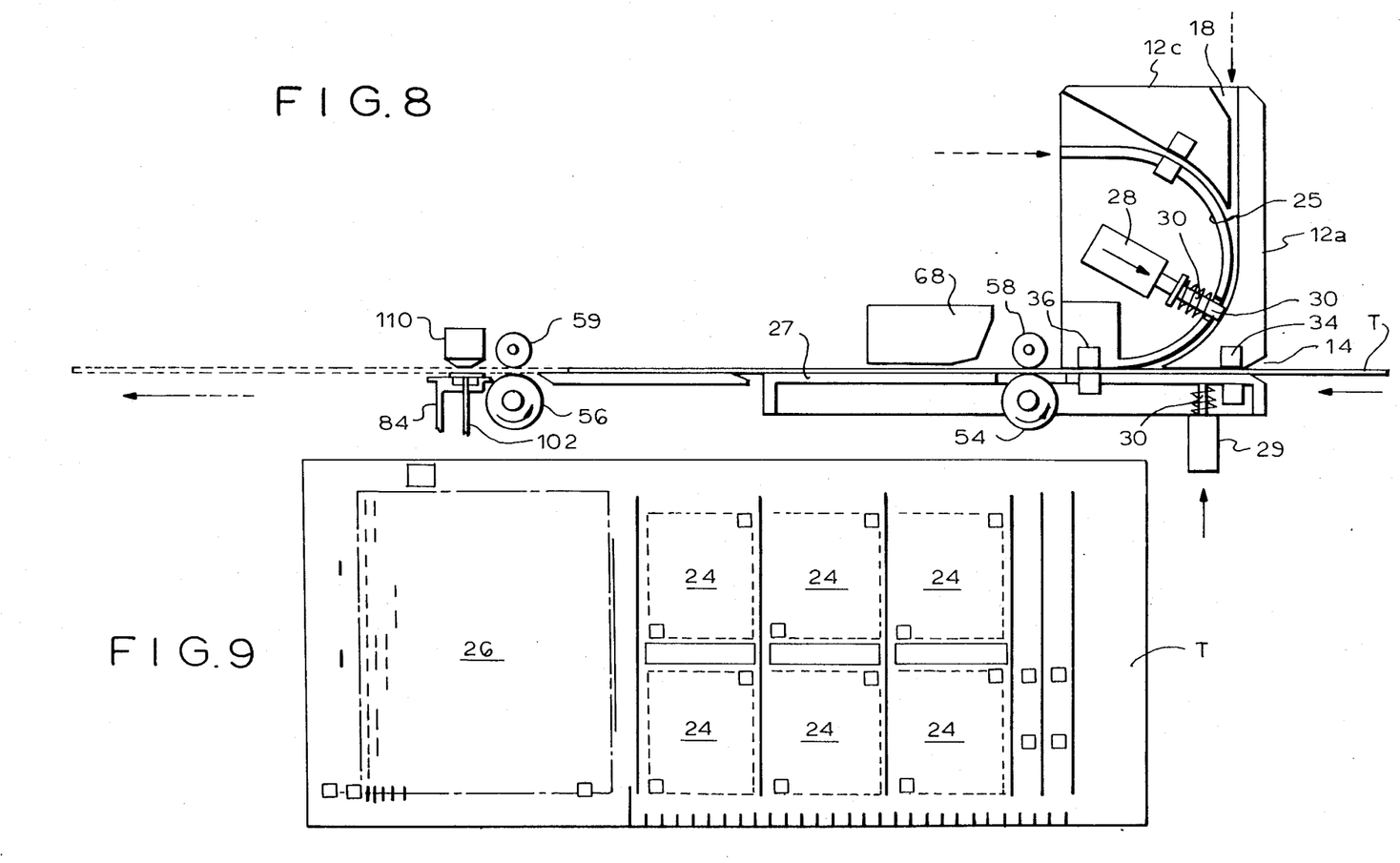
FIG. 8 is a view similar to that of FIG. 6, but showing the ticket path when the ticket is inserted from the customer side of the ticket processor of the present invention.
FIG. 9 is a representation of a typical ticket which can be used in conjunction with the ticket processor of the present invention; and, FIG. 10 is an isometric view illustrating the ticket transport path and transport mechanism of the present invention.

The processor is designed to accept tickets of the type shown in FIG. 9. Such a ticket is provided with a plurality of markable areas 24 which can be marked by the customer to indicate the desired transactional data, for example, numbers in a lottery. The ticket is also provided with an area 26 within which the transactional data can be imprinted by the processor, either in machine-readable or customer-readable form, or both.

Transactions with the ticket processor of the present invention can be initiated either by the agent or by the customer. In either case, a ticket of the type shown in FIG. 9 is pre-marked by the customer with the desired transactional data, such as six numbers selected for a lottery drawing. When initiated by the agent, the customer hands the premarked ticket to the agent along with the money to be bet. The agent inserts the ticket T into either input slot 16 or 18 and manipulates the pushbuttons in area 22 to operate the processor such that it prints the ticket T with the transactional information, as well as recording same in an electronic memory, usually remote from the processor and connected thereto by suitable communication lines. Once printed, the ticket is ejected from slot 20 toward the agent who takes the ticket and hands it to the customer as a receipt.

The processor of the present invention can also be used with customer initiated transactions. In this instance, the customer takes the pre-marked ticket and inserts the ticket T either into input slot 14 or 18. The agent operates the processor such that the ticket is read and the information marked thereon by the customer is recorded and printed on area 26 of the ticket. The ticket is then ejected at slot 20 to the agent. The agent collects the money from the customer and hands the customer the ticket as a receipt.

Figure 3:
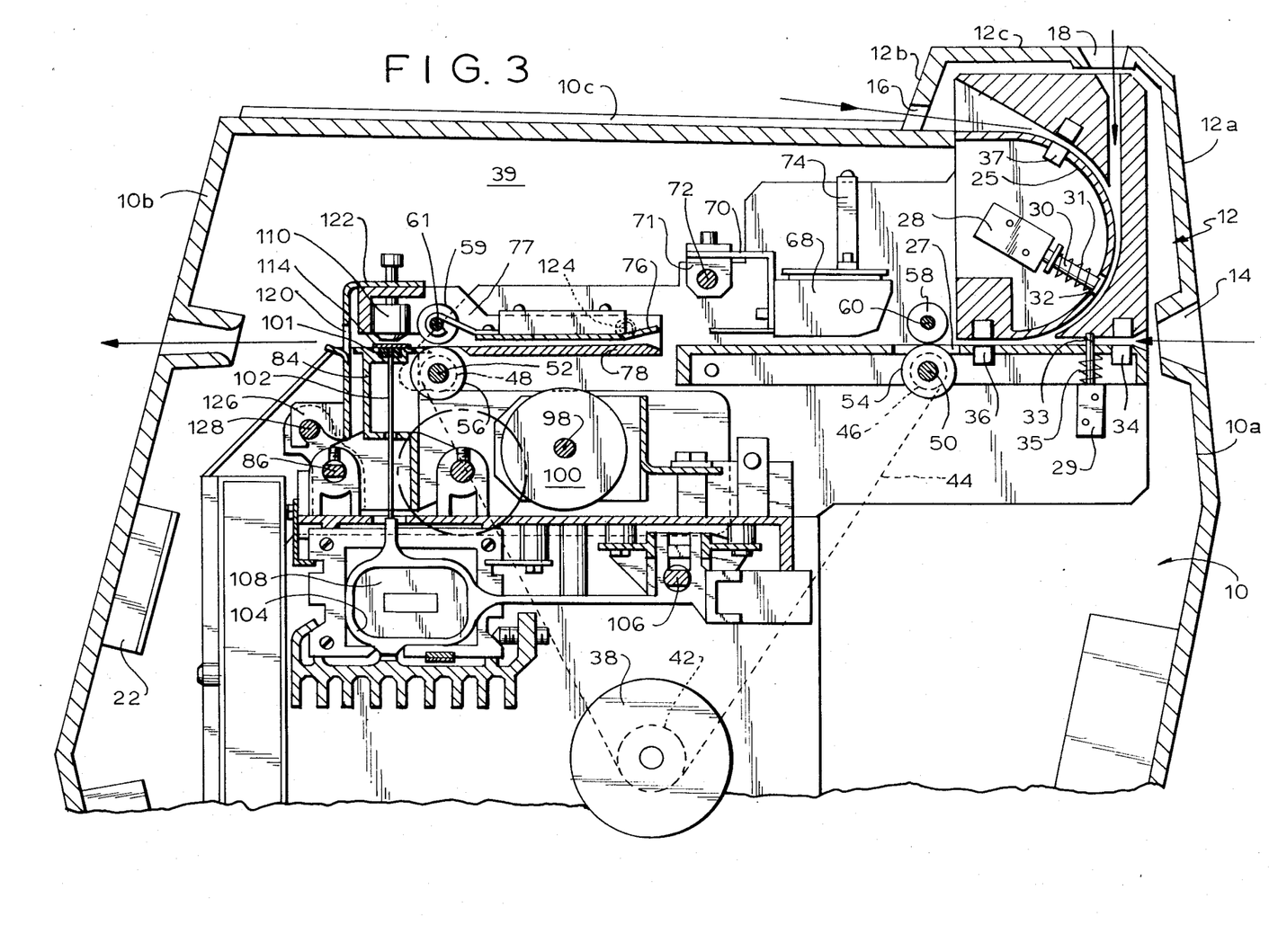
FIG. 3 is a side cross-sectional view of the ticket processor of the present invention.
Figure 4:
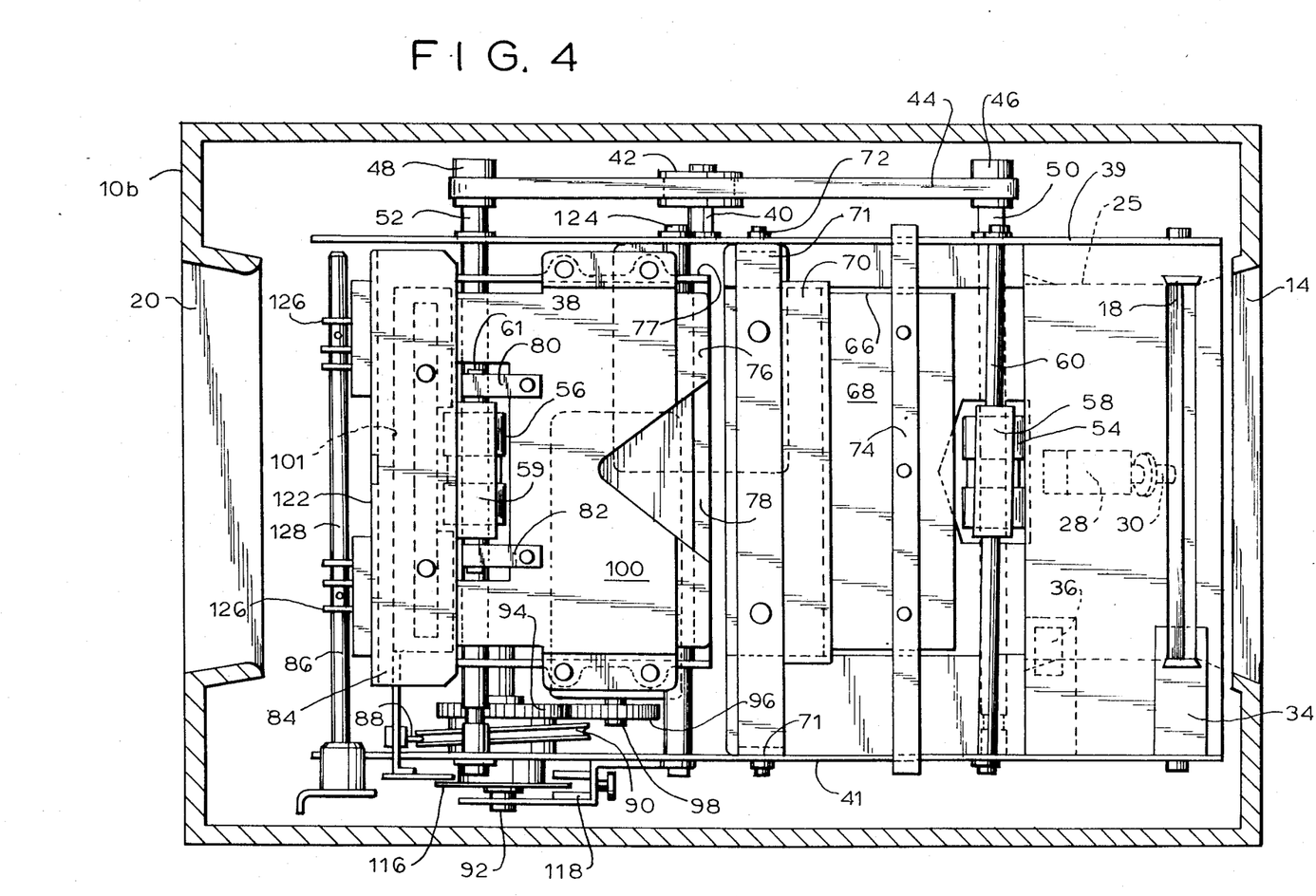
FIG. 4 is a top plan view of the interior of the ticket processor of the present invention.

As best seen in FIGS. 3 and 4, the input portion 12 of the processor includes an arcuate, preferably generally semicircular channel 25 which begins at a flared portion adjacent slot 16, intersects the end of slot 18 near its mid-point and intersects the end of slot 14 near its termination. Channel 25 leads into the ticket transport path 27. Accordingly, input slots 16, 18 and 14 intersect with channel 25 at spaced points along the channel such that tickets inserted through any one of these input slots are directed into and through the channel 25 into ticket transport path 27.

Situated in the interior of input portion 12 is a ticket "lock-out" solenoid 28 having an extendible rod 30 aligned with an opening 32 in the wall of channel 25. A spring 31 is provided around rod 30 to urge same toward the retracted position. When rod 30 is extended by the actuation of solenoid 28, the end of the rod obstructs channel 25 at a point between where input slot 18 enters the channel and where input slot 14 enters the channel. Thus, when solenoid 28 is actuated such that rod 30 is extended, no tickets can pass from either slot 16 or slot 18 through the latter portion of the channel 25 into transport path 27.

A sensor 34, either of the mechanical or photo-electric type, is provided along slot 14 such that when a ticket is inserted into slot 14 by a customer, solenoid 28 is actuated such that rod 30 extends to prevent tickets inserted in slots 16 or 18 from passing through the latter portion of channel 25 into transport path 27. Accordingly, when a ticket is inserted by a customer through input slot 14, tickets from input slots 16 and 18 are "locked-out" of the processor until the customer inserted ticket has been processed.

A second ticket "lock-out" solenoid 29 is situated in input portion 12 proximate input slot 14. Solenoid 29 has an extendible rod 33 aligned with an opening in the wall of slot 14. A spring 35 is provided around rod 33 to urge same toward the retracted position. When rod 33 is extended by the actuation of solenoid 29, the end of rod 33 obstructs slot 14 to prevent a ticket from being inserted from the customer side of the processor.

A sensor 37, either of the mechanical or photo-electric type, is provided along in channel 25 such that when a ticket is inserted into slot 16 by the agent, solenoid 29 is actuated to extend rod 33 to prevent a ticket from passing through slot 14 and into transport path 27. Accordingly, when a ticket is inserted by the agent through slot 16, tickets inserted by the customer through slot 14 are "locked out" of the processor until the agent inserted ticket has been processed.

A third ticket sensor 36, preferably of the photo-electric type, is provided proximate the end of channel 25. Sensor 36 detects the presence of the leading edge of a ticket at the end of channel 25 and, in response, actuates a transport drive motor 38 located within the lower portion of base portion 10. The output shaft 40 of motor 38 extends beyond frame 39 and has a pulley 42 mounted thereon. A belt 44 passes around pulley 42 and a pair of spaced pullies 46, 48 which, in turn, are connected to shafts 50, 52 (which also extend beyond frame 39) upon which a pair of drive rollers 54, 56 are respectively mounted.

Drive roller 54 is aligned with and cooperates with a pressure roller 58 mounted on a shaft 60 to form the drive at the input end of transport path 27. Drive roller 56 cooperates with a pressure roller 58 mounted on a shaft 61 to provide the drive at the output end of transport path 27, immediately prior to output slot 20. Tickets are moved through the transport path by these roller pairs, both of which are driven to a single drive motor, adding to the simplicity of the processor.

As can be best seen from FIG. 4, shaft 60 upon which roller 58 is mounted is situated at an incline with respect to a plane perpendicular to frame 39 so as to skew the ticket against the side 66 of transport path 27. This causes the ticket to properly align with a fiber-optic mark sense read head 68 of conventional design. Read head 68 is supported immediately above the transport path 27, at a point behind rollers 54 and 60, on an "L"-shaped bracket 70 which extends from one upstanding frame section to the other. As the ticket T passes under read head 68, the customer marked sections 24 are read.

Figure 5:
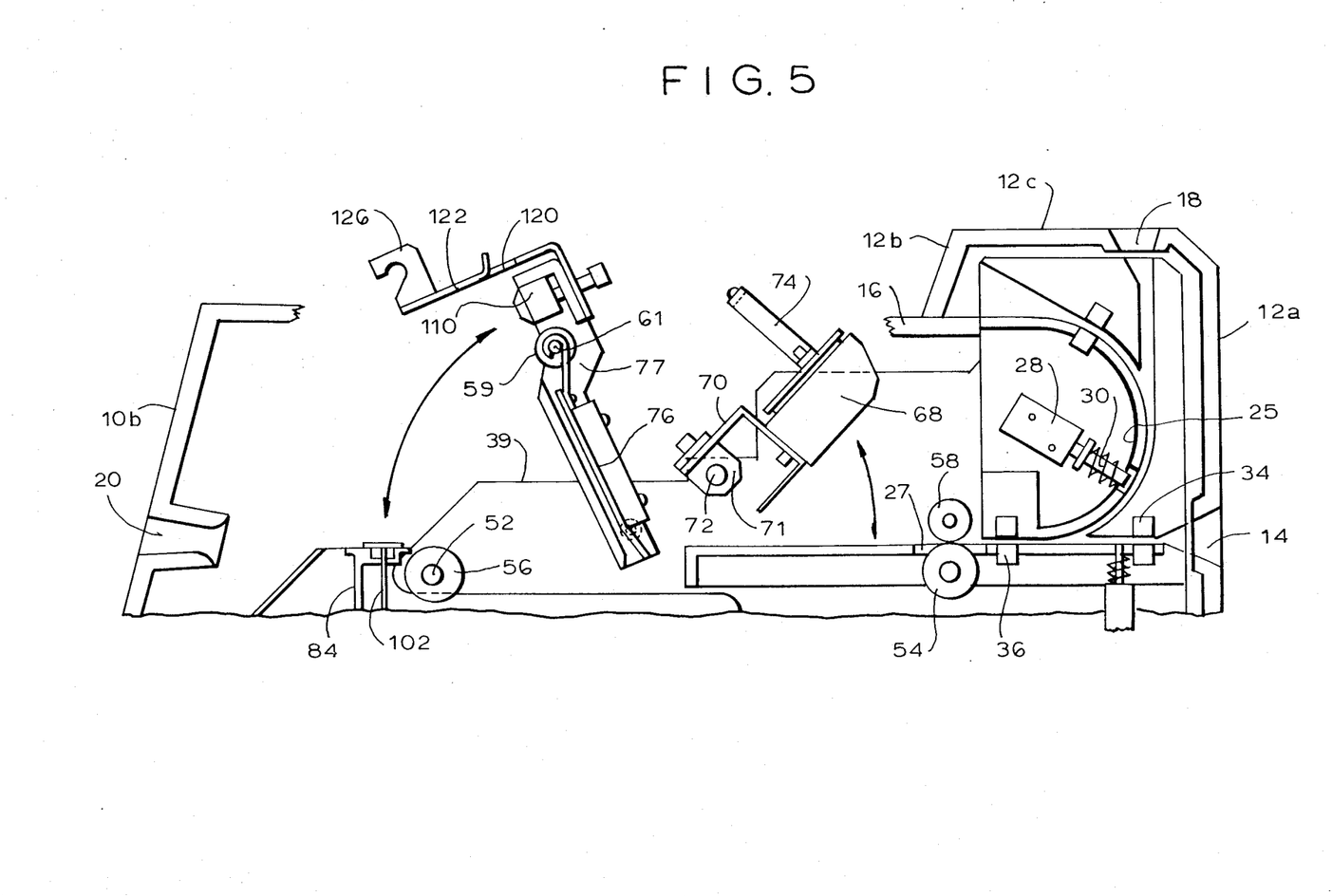
FIG. 5 is a side view of the upper portion of the interior of the ticket processor of the present invention showing the reading means and printer means pivoted to permit access to the ticket transport path.

Upstanding portions 71 of bracket 70 are connected to a shaft 72 extending between opposite frame sections 39, 41. As illustrated in FIG. 5, the mark sense read head 68 can be rotated about shaft 72 so as to place same in a remote position from the transport path 27 to permit access to the head or transport path, if necessary. A second bracket 74, connected to the top of head 68, is wider than the distance between frame sections 39 and 41 such that the ends thereof rest on the upper edges of frame sections 39, 41 so as to appropriately position head 68 with respect to the transport path.

After the leading edge of the ticket passes through the read section, it is received between spaced guides 76 and 78, mounted on a pivotable bracket 77. It then passes between rollers 56 and 59. Shaft 61 upon which roller 59 is mounted is, in turn, mounted on a pair of spring brackets 80, 82, the ends of which extend from the rear portion of bracket 77. After the leading edge of the ticket passes between rollers 56 and 59, it is aligned with the printing mechanism which is preferably a shuttle-type dot matrix print head, similar to the type described in detail in U.S. Pat. No. 4,534,287, entitled "Dot Matrix Print Head", issued Aug. 13, 1985 to Robert A. Meloni and assigned to the assignee hereof.

In general, the print mechanism comprises a shuttle part 84 movably mounted for back and forth movement in a direction transverse to the ticket transport path relative to a fixedly mounted shaft 86. At one end of part 84 is a projection 88 (FIG. 4) which extends into the grooved periphery of a disc 90 which, in turn, is mounted on a shaft 92 connected by gears 94 and 96 to the output shaft 98 of a shuttle motor 100. When actuated, motor 100 rotates shaft 98, thereby rotating gears 96 and 94. The rotation of gear 94 rotates disc 90 which is mounted on shaft 92 in a skewed fashion such that shuttle 84 moves back and forth in a direction transverse to ticket movement. Mounted on the top of part 84 is a wire bearing 101 having a plurality of spaced openings therein. Located below bearing 101 are a plurality of vertical print wires 102, each of which extends from an actuator or hammer 104, the ends of which are suspended in cantilever fashion from a fixedly mounted shaft 106. The impact ends of print wires 104 are situated in the openings in bearing 101.

The structure of actuators 104 is described in detail in U.S. Pat. No. 4,349,282, entitled "Hammer For Dot Matrix Printer" issued to Thomas Sapitowicz and Robert Meloni on Sept. 14, 1982 and assigned to the assignee herein. Each actuator 104 has a flat coil 108 mounted in the interior thereof. Actuators 104 are situated in side-by-side relation between a pair of permanent magnets (not shown). Actuation of an individual actuator 104, by passing current through the coil 108 mounted thereon, causes the actuator to displace the print wire 102 attached thereto in an upwards direction. This causes the impact end of the print wire to extend beyond the surface of bearing 101, towards a stationary anvil 110 situated at a spaced position above the bearing.

An ink ribbon 114, extending between a pair of spools (not shown), extends between bearing 101 and anvil 110. The ribbon is advanced by a motor (not shown) connected to one of the spools, in a conventional manner.

The movement of the shuttle part 84 causes the impact ends of the print wires 102 to move back and forth in a direction transverse to the direction of the ticket path. The actuation of the individual actuators 104, which is synchronized with the movement of shuttle part 84, causes dots to be imprinted on the face of ticket T in section 26, so as to form machine-readable and/or customer readable information thereon, in a conventional fashion.

At the extreme end of shaft 92 is mounted a strobe disc 116 which, in conjunction with a photo-electric sensing mechanism 118 (of conventional design) permits the actuator electronics (not shown) to time the energization of the various actuators 104 with the movement of shuttle part 84 so as to imprint the dots in the appropriate places on the ticket.

After imprinting, the leading edge of the ticket passes through an opening 120 on the vertical section of "L"-shaped bracket 122 to the entrance of output slot 20. Bracket 122 carries anvil 110 in a position adjustable fashion. Bracket 122 is mounted on bracket 77 which is pivotably supported on a shaft 124 which extends between the vertical frame sections 39 and 41. Bracket 77 can be pivoted relative to shaft 124 such that the transport path above the printer can be accessed, as shown in FIG. 5. The lower end of the vertical section of bracket 122 is provided with a pair of rearwardly extending parts 126 with "U"-shaped openings designed to rest on a fixed shaft 128 so as to properly position bracket 122 and, hence, anvil 110 relative to the wire bearing 101.

Figure 6:
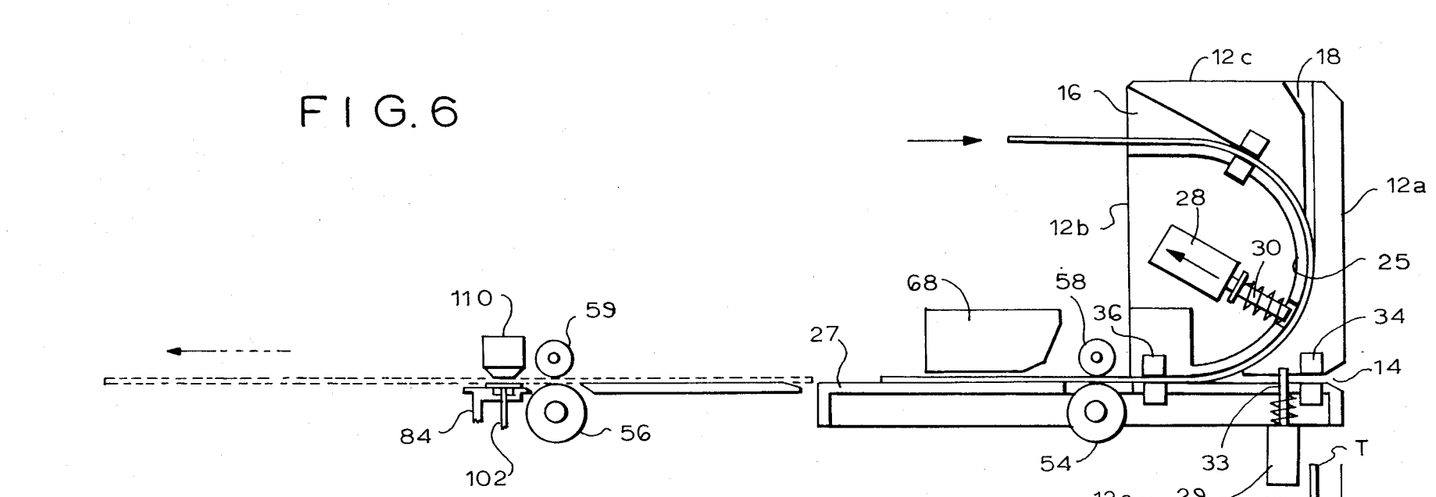
FIG. 6 is a schematic representation illustrating the path of a ticket inserted from the agent side of the ticket processor of the present invention.

FIG. 6 shows the ticket path when a ticket T is inserted through slot 16 on side 12b of input section 12. The ticket T bends in an arcuate path to follow the contour of channel 25 such that the leading edge passes sensor 37 and then the end of rod 30, which is in the retracted position so as not to obstruct the channel. Sensor 37 actuates solenoid 29 to extend rod 33 and, hence, block input slot 14 to prevent tickets from being inserted by the customer until the agent inserted ticket is processed. When the leading edge of the ticket passes through sensor 36, motor 38 is actuated so as to drive roller 54 such that the ticket is driven past read head 68, between rollers 56 and 59, through the printer and out of output slot 20.

Figure 7:
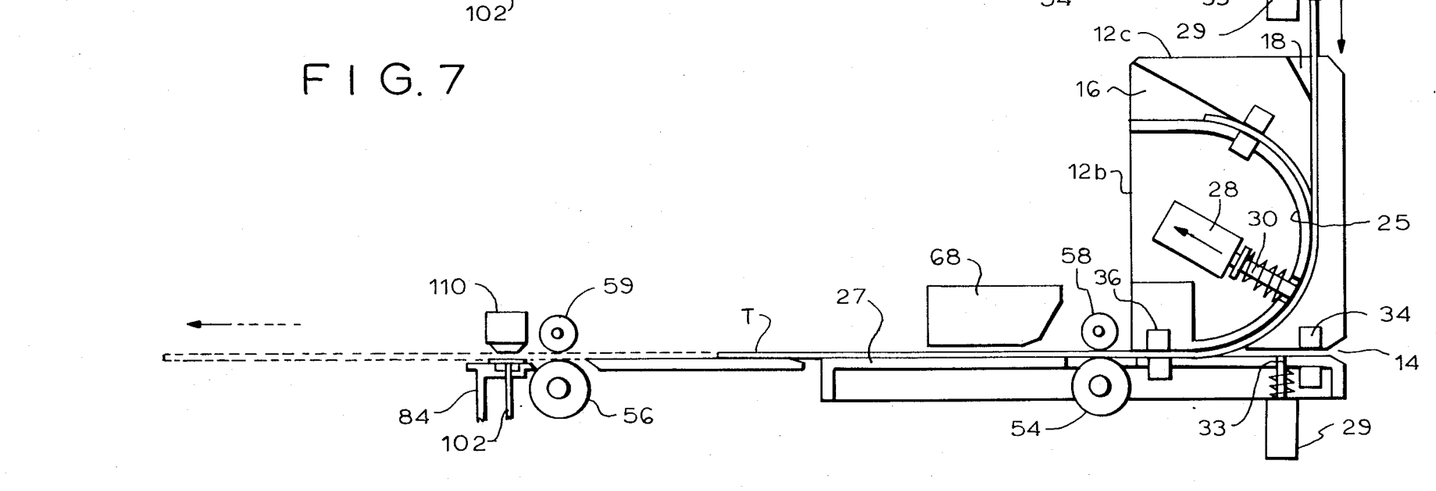
FIG. 7 is a view similar to that of FIG. 6, but showing the ticket path when the ticket is inserted from the top of the ticket processor of the present invention.

As seen in FIG. 7, when the ticket T is inserted, either by the agent or by the customer, through input slot 18 located on top surface 12c of the input section 12, it enters channel 25 at a point approximately mid-way therein, but prior to the section of channel 25 which is aligned with rod 30 of solenoid 28. Rod 30 is retracted so as not to obstruct the channel. The leading edge of the ticket passes through sensor 36 which actuates motor 38 to drive the ticket along path 27 past the read head 68 and printing mechanism to the output slot 20.

As shown in FIG. 8, when a ticket T is inserted through slot 14 on side 12a of input section 12, it first passes through sensor 34 which actuates lock-out solenoid 28 to extend rod 30 against the action of spring 31 so as to obstruct channel 25 downstream of slots 16 and 18. This prevents tickets inserted in input slots 16 and 18 from entering the latter portion of channel 25 at the same time as the ticket received through slot 14. The leading edge of the ticket then passes through sensor 36, actuating motor 38, through transport path 27, including reader 68 and the printer, until it reaches output slot 20.

Figure 10:
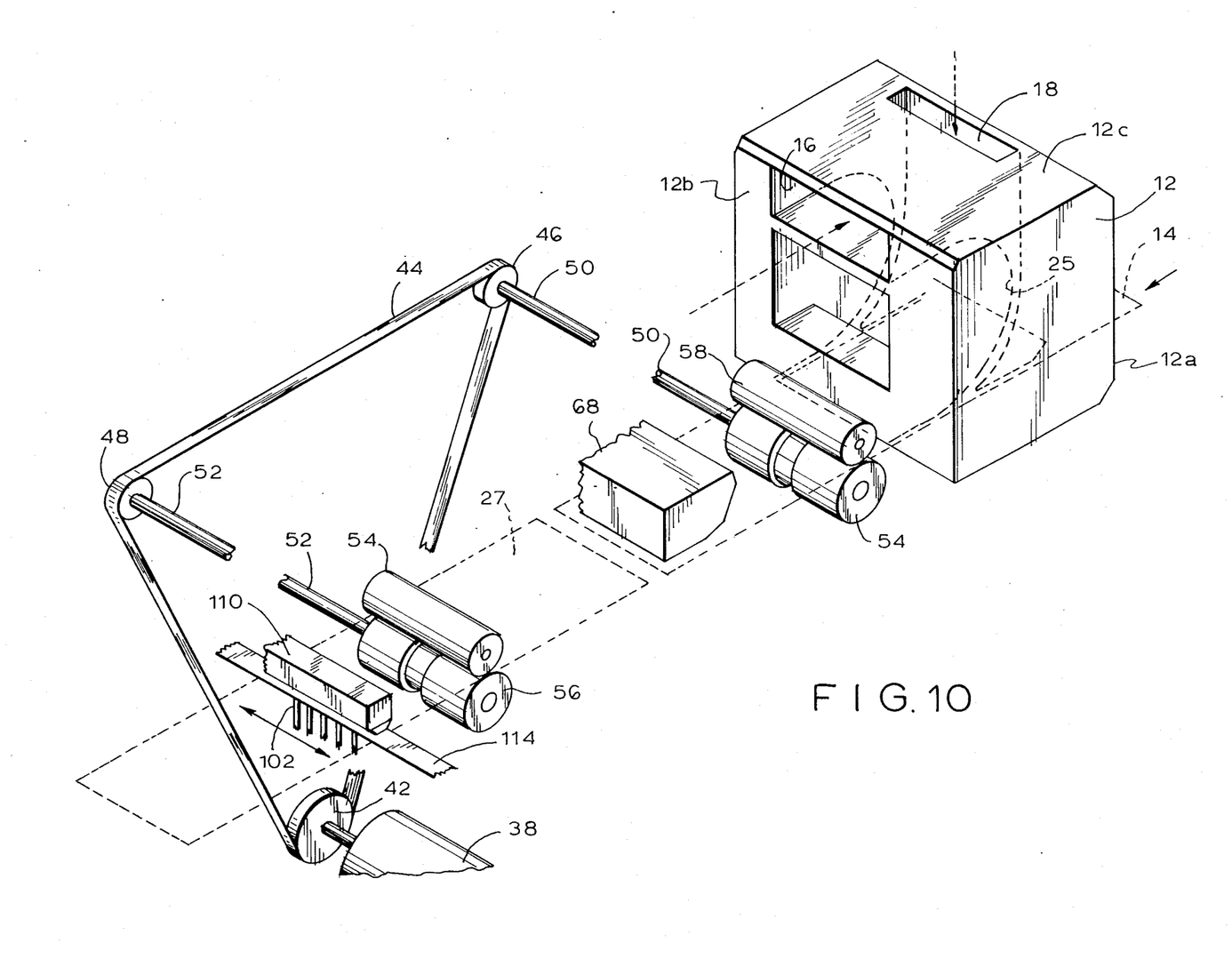

FIG. 10 illustrates transport path 27 in perspective view showing channel 25 and the input section 12 with input slots 14, 16 and 18. Drive rollers 54 and 56 mounted on shafts 50 and 52, respectively, are shown, as are pressure rollers 58 and 59. It can be clearly seen that pullies 46 and 48, mounted on shafts 50 and 52 respectively, are both operably connected to belt 44 which, in turn, is situated around pulley 42 connected to the output shaft of drive motor 38. This figure clearly indicates that the transport path 27 is substantially a straight line and a single drive motor is utilized to power both drive rollers such that a highly compact ticket processor is achieved.

It will now be appreciated that the present invention relates to a multiple input compact ticket processor which has an input section including three separate input slots, one of which faces the agent, a second of which faces the customer, and a third of which is situated on the top surface of the housing to permit either the agent or customer to insert a ticket therein. The inserted ticket travels around an arcuate channel into a straight line transport path, through which it is driven by rollers connected to a single drive motor. Along the transport path is located the read head and print mechanism. Lock-out solenoids, situated in the arcuate channel and customer side input slot, prevent tickets from being inserted through the input slot on the agent side or the slot on the top surface when a ticket is received through the customer input slot and from being inserted through the input slot on the agent side when a ticket is received through the input slot on the customer side.

While only a single preferred embodiment of the present invention has been disclosed herein for purposes of illustration, it is obvious that many variations and modifications could be made thereto. It is intended to cover all of these variations and modifications which fall within the scope of the present invention, as defined by the following claims.

What is claimed is:

1. A ticket processor of the type adapted to receive customer-marked tickets comprising a housing having an input portion and a processing portion, said input portion having first, second, and third surfaces, ticket input means situated within said input portion, ticket reader means, ticket printer means, and ticket output means situated within said processing portion, said ticket input means comprising first, second, and third input slots located on said first, second and third surfaces, respectively, said first and second surfaces facing in substantially opposite directions and said third surface facing in a direction substantially perpendicular to said first and second surfaces.

2. The processor of claim 1, wherein said processing portion comprises a fourth surface and said output means comprises an output slot situated on said fourth surface, said fourth surface being substantially parallel to said first surface.

3. The processor of claim 1, wherein said input means further comprises an arcuate channel into which said first, second, and third input slots feed.

4. The processor of claim 1, further comprising means associated with one of said first, second and third input slots for sensing the presence of a ticket therein and means, actuated in response to the sensing of the presence of a ticket in said one input slot, for preventing a ticket from being received into said reader means from the other of said input slots.

5. The processor of claim 1, further comprising a substantially straight line ticket transport path from said input means, through said reader means, through said printer means to said output means.

6. The processor of claim 1, further comprising a ticket transport path from said input means to said output means, first and second drive means along said ticket transport path for moving a ticket, a motor, and means for operably mechanically connecting each of said first and second drive means with said motor.

7. The processor of claim 6, further comprising means associated with said input means for sensing the presence of a ticket and means for actuating said motor when the presence of a ticket is sensed.

8. A ticket processor adapted for use with customer-markable tickets insertable by either a customer or agent, said processor comprising a housing with an input portion and a processing portion, said input portion comprising an agent side and a customer side, input means comprising a first input slot for accepting a ticket from said agent side, a second input slot for accepting a ticket from said customer side, and a third input slot for accepting a ticket from either the agent or customer, ticket reader means, ticket printer means, and ticket output means in said processing portion, said ticket output means ejecting tickets on a side of said processing portion substantially parallel to said agent side.

9. The processor of claim 8, wherein said input portion has a top surface and wherein said third input slot is located on said top surface.

10. The processor of claim 8, wherein said input means comprises an arcuate ticket channel into which said first, second and third input slots feed.

11. The processor of claim 8, further comprising means associated with one of said first, second and third input slots for sensing the presence of a ticket therein and means, actuated in response to the sensing of the presence of a ticket in said one input slot, for preventing a ticket from being received into said reader means from the other of said input slots.

12. The processor of claim 8, further comprising a substantially straight line ticket transport path from said input means, through said reader means, through said printer means to said output means.

13. The processor of claim 8, further comprising a ticket transport path from said input means to said output means, first and second drive means along said ticket transport path for moving a ticket, a motor and means for operably mechanically connecting each of said first and second drive means with said motor.

14. The processor of claim 13, further comprising means associated with said input means for sensing the presence of a ticket and means for actuating said motor when the presence of a ticket is sensed.

15. A ticket processor of the type adapted to receive customer-marked tickets comprising a housing having an input portion and a processing portion, said input portion having first and second surfaces, ticket input means situated within said input portion, ticket reader means, ticket printer means, and ticket output means situated within said processing portion, said ticket input means comprising first and second input slots located on said first and second surfaces, respectively, and means associated with one of said inout slots for preventing a ticket from being received into said reader means from said other of said input slots when a ticket is present in said one input slot.

16. The processor of claim 15, further comprising second means associated with said other of said input slots for preventing a ticket from being received into said reader means from said one input slot when a ticket is present in said other of said input slots.

17. The processor of claim 16, wherein said input means has an agent side and a customer side and wherein said one of said slots accepts a ticket from said agent side and said other of said slots accepts a ticket from said customer side.

18. The processor of claim 15, further comprising ticket sensing means, located proximate said one of said slots, for actuating said preventing means when a ticket is present in said one input slot.

19. The processor of claim 16, further comprising ticket sensing means, located proximate said other of said slots, for actuating said second preventing means when a ticket is present in said other of said input slots.

20. The processor of claim 17, wherein said input portion has a third surface and further comprising a third input slot on said third surface, said third input slot accepting a ticket from either said agent side or said customer side of said processor.

21. The processor of claim 15, wherein said first and second surfaces face in substantially opposite directions.

22. The processor of claim 21, wherein said input portion has a third surface and further comprising a third input slot on said third surface, said third input slot accepting a ticket from either said agent side or said customer side of said processor.

23. The processor of claim 22, wherein said third surface is substantially perpendicular to said first and second surfaces.

24. The processor of claim 15, wherein said processing portion comprises a surface and said ticket output means comprises an output slot located on said processing portion surface and said processing portion surface is substantially parallel to one of said first and second surfaces.

25. The processor of claim 17, wherein said processing portion comprises an agent side and said ticket output means comprises an output slot located on said agent side of said processing portion.

* * * * *